United States Patent
Huang

(10) Patent No.: US 10,828,604 B2
(45) Date of Patent: Nov. 10, 2020

(54) EXHAUST GAS TREATMENT SYSTEM AND METHOD WITH NON-THERMAL PLASMA GENERATOR

(71) Applicant: Deere & Company, Moline, IL (US)

(72) Inventor: Shyan-Cherng Huang, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 44 days.

(21) Appl. No.: 16/214,052

(22) Filed: Dec. 8, 2018

(65) Prior Publication Data
US 2020/0179875 A1  Jun. 11, 2020

(51) Int. Cl.
| | |
|---|---|
| B01D 53/94 | (2006.01) |
| F01N 3/02 | (2006.01) |
| F01N 3/035 | (2006.01) |
| F01N 3/08 | (2006.01) |
| F01N 3/20 | (2006.01) |
| F01N 13/00 | (2010.01) |
| F01N 3/023 | (2006.01) |

(52) U.S. Cl.
CPC ....... B01D 53/9418 (2013.01); F01N 3/0231 (2013.01); F01N 3/035 (2013.01); F01N 3/0842 (2013.01); F01N 3/2066 (2013.01); F01N 13/009 (2014.06); F01N 2240/28 (2013.01)

(58) Field of Classification Search
CPC .... F01N 3/0231; F01N 3/0275; F01N 3/2066; F01N 13/009; F01N 2240/28; F01N 2240/38; B01D 53/9418
See application file for complete search history.

(56) References Cited

U.S. PATENT DOCUMENTS

| | | | |
|---|---|---|---|
| 6,202,407 B1 | 3/2001 | Brusasco et al. | |
| 7,074,370 B2 * | 7/2006 | Segal | B01D 53/945 422/186.04 |
| 7,454,895 B2 | 11/2008 | Hoard et al. | |
| 7,767,166 B2 | 8/2010 | Zhan et al. | |
| 8,037,674 B2 | 10/2011 | Kupe et al. | |
| 2007/0243115 A1 * | 10/2007 | Tsumagari | F01N 3/035 422/168 |
| 2016/0175776 A1 * | 6/2016 | Gloeckle | B01D 53/9431 423/212 |

(Continued)

FOREIGN PATENT DOCUMENTS

WO    WO-0043469 A2 *  7/2000

*Primary Examiner* — Audrey K Bradley
(74) *Attorney, Agent, or Firm* — Michael Best & Friedrich LLP

(57) ABSTRACT

An exhaust gas treatment system for an internal combustion engine includes an exhaust gas pathway configured to receive exhaust gas from the internal combustion engine and a non-thermal plasma generator positioned in the exhaust gas pathway. The non-thermal plasma generator is configured to increase a proportion of nitrogen dioxide in the exhaust gas. The system also includes a first treatment element positioned in the exhaust gas pathway downstream of the non-thermal plasma generator and a second treatment element positioned in the exhaust gas pathway downstream of the first treatment element. At least one of the first treatment element or the second treatment element includes a combined selective catalytic reduction and diesel particulate filter (SCR+F) element.

18 Claims, 6 Drawing Sheets

(56) References Cited

U.S. PATENT DOCUMENTS

2017/0087515 A1\* 3/2017 Huang ............... B01D 53/9477
2017/0335731 A1   11/2017 Schickler et al.
2019/0048770 A1\* 2/2019 Wang .................... F02M 26/22

\* cited by examiner

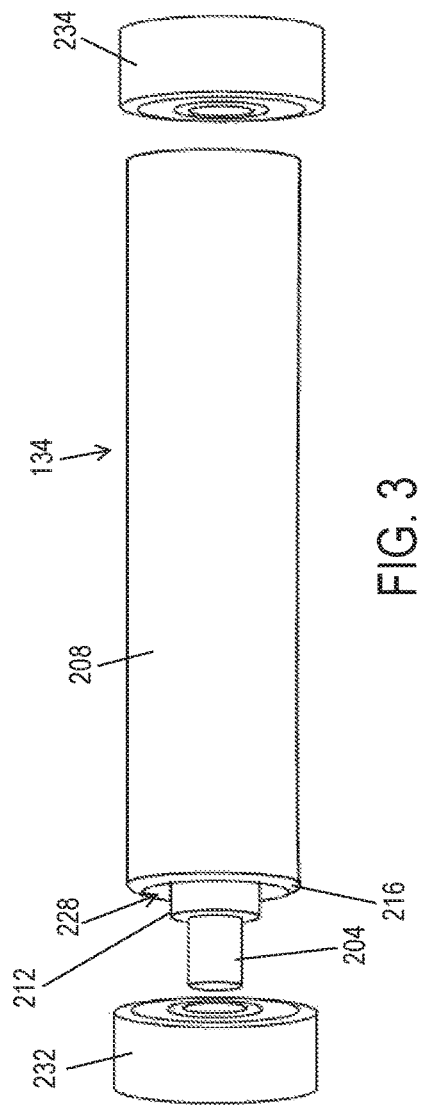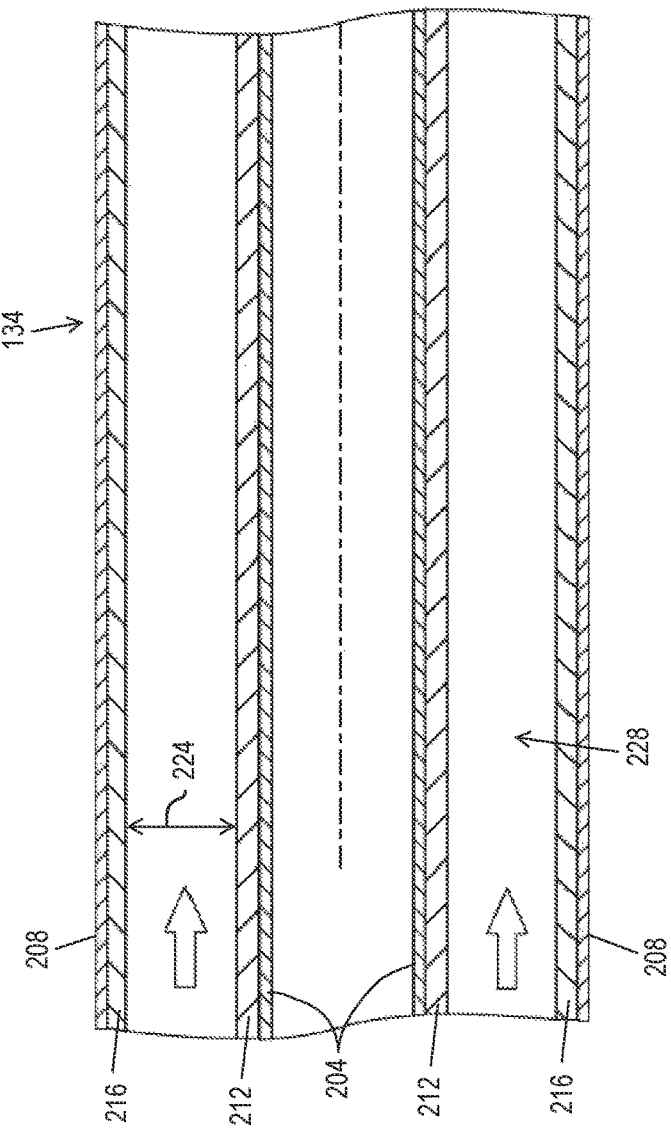

EXHAUST GAS TREATMENT SYSTEM AND METHOD WITH NON-THERMAL PLASMA GENERATOR

BACKGROUND

The present disclosure relates to exhaust systems and more particularly to diesel exhaust gas treatment systems.

Diesel exhaust is typically subject to emissions regulations covering a variety of emission components, including particulate matter and nitrogen oxides ($NO_x$). A variety of exhaust treatment devices have been developed to reduce these emission components. For example, a selective catalytic reduction (SCR) element can be used to convert the $NO_x$ present in exhaust gas into other compounds, such as nitrogen, water, and carbon dioxide.

Typically, diesel exhaust fluid (DEF)—a solution of urea and deionized water—is injected upstream of the SCR element to provide ammonia, which acts as a reducing agent and reacts with the $NO_x$ in the presence of the SCR catalyst in accordance with Equation (1):

$$NO+NO_2+2NH_3 \rightarrow 2N_2+3H_2O \qquad (1)$$

The $NO_x$ and ammonia are thus converted into nitrogen and water. As evident from Equation (1), the optimal stoichiometric ratio for this reaction includes equal parts of nitric oxide (NO) and nitrogen dioxide ($NO_2$).

Particulate matter is another component of diesel exhaust emissions being targeted with increasingly stringent regulations. A diesel particulate filter (DPF) or combined selective catalytic reduction and diesel particulate filter (SCR+F) can be used to trap diesel particulate matter. During operation, trapped soot on the filter element(s) can be oxidized through a process commonly referred to as passive regeneration. In particular, during passive regeneration, the carbon-based soot reacts with $NO_2$ in accordance with Equation (2) and Equation (3):

$$C+2NO_2 \rightarrow CO_2+2NO \qquad (2)$$

$$C+NO_2 \rightarrow CO+NO \qquad (3)$$

As evident from Equations (2) and (3), $NO_2$ also plays an important role in soot oxidation.

To provide enough $NO_2$ for $NO_x$ reduction and soot oxidation, some emissions systems include a diesel oxidation catalyst (DOC) upstream of a SCR and a DPF or a SCR+F element. The DOC includes one or more precious metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions and enhances passive soot oxidation.

SUMMARY

A DOC, however, only efficiently produces $NO_2$ at relatively warm temperatures (e.g., at least 300 degrees Celsius). In addition, at low temperatures (e.g., about 200 degrees Celsius or less) that occur during a cold start state of the engine or during very cold ambient operating conditions, the DOC may instead consume $NO_2$ by reacting $NO_2$ with carbon monoxide and hydrocarbons in the exhaust gas. This reduces the efficacy of downstream SCR elements. The DOC also adds thermal mass to the exhaust gas treatment system, which delays warm-up of downstream treatment elements. Finally, particles of the precious metal catalyst from the DOC may become entrained with the exhaust. These particles may travel with the exhaust and attach to the filtration media in a downstream DPF or SCR+F element. When ammonia is exposed to the precious metal particles trapped in the DPF or SCR+F element, the ammonia is oxidized by oxygen, reducing ammonia availability for $NO_x$ reduction. In addition, the ammonia itself may produce additional undesirable $NO_x$ when it is oxidized.

Heating devices such as fuel burners and/or electric heaters may be used to add heat to an exhaust gas treatment system to reduce the duration of a cold start state. However, such heating devices may have a relatively high energy requirement and/or be relatively inefficient.

Low temperature $NO_x$ reduction is an increasingly important consideration as emissions regulations become more stringent. Accordingly, a need exists for an exhaust gas treatment system able to efficiently increase a fraction of $NO_2$ in the exhaust gas, particularly at low temperatures, to enhance soot oxidation on filter elements and enhance $NO_x$ reduction in SCR elements without use of an upstream DOC or other precious metal catalyst.

The present disclosure provides, in one aspect, an exhaust gas treatment system for an internal combustion engine. The system includes an exhaust gas pathway configured to receive exhaust gas from the internal combustion engine and a non-thermal plasma generator positioned in the exhaust gas pathway. The non-thermal plasma generator is configured to increase a proportion of nitrogen dioxide in the exhaust gas. The system also includes a first treatment element positioned in the exhaust gas pathway downstream of the non-thermal plasma generator and a second treatment element positioned in the exhaust gas pathway downstream of the first treatment element. At least one of the first treatment element or the second treatment element includes a combined selective catalytic reduction and diesel particulate filter (SCR+F) element.

In some embodiments, the exhaust gas treatment system also includes an injector configured to inject reductant into the exhaust gas pathway.

In some embodiments, the injector is configured to inject the reductant into the exhaust gas pathway between the non-thermal plasma generator and the first treatment element.

In some embodiments, the second treatment element includes a selective catalytic reduction (SCR) element.

In some embodiments, the exhaust gas treatment system does not include a precious metal catalyst upstream of the first treatment element.

In some embodiments, the exhaust gas treatment system includes an ammonia oxidation catalyst (AOC) positioned in the exhaust gas pathway downstream of the second treatment element.

In some embodiments, the non-thermal plasma generator includes a first electrode, a second electrode, and a passage defined between the first electrode and the second electrode, and in some embodiments, the non-thermal plasma generator is configured such that at least a portion of the exhaust gas flows through the passage during operation of the non-thermal plasma generator.

In some embodiments, the exhaust gas pathway is configured such that a portion of the exhaust gas bypasses the non-thermal plasma generator.

In some embodiments, the exhaust gas treatment system includes an alternating current power supply operable at a frequency of at least 1,000 hertz, the power supply configured to generate a peak voltage between the first electrode and the second electrode with a magnitude of at least 1,000 volts.

In some embodiments, the exhaust gas treatment system includes a controller in communication with the power supply, the controller configured to vary at least one of the frequency or the voltage of the power supply to vary the proportion of nitrogen dioxide in the exhaust gas.

The present disclosure provides, in another aspect, an exhaust gas treatment system for an internal combustion engine. The system includes an exhaust gas pathway configured to receive exhaust gas from the internal combustion engine, a non-thermal plasma generator positioned in the exhaust gas pathway such that at least a portion of the exhaust gas flows through the non-thermal plasma generator, and a combined selective catalytic reduction and diesel particulate filter (SCR+F) element positioned downstream of the non-thermal plasma generator.

In some embodiments, the exhaust gas treatment system does not include a precious metal catalyst upstream of the SCR+F element.

In some embodiments, the non-thermal plasma generator includes a first electrode, a second electrode, and a passage defined between the first electrode and the second electrode. In some embodiments, the non-thermal plasma generator is configured such that only a portion of the exhaust gas flows through the passage during operation of the non-thermal plasma generator.

In some embodiments, the exhaust gas treatment system includes an alternating current power supply operable at a frequency of at least 1,000 hertz. The power supply is configured to generate a peak voltage between the first electrode and the second electrode with a magnitude of at least 1,000 volts. In some embodiments, the exhaust gas treatment system also includes a controller in communication with the power supply, the controller configured to vary at least one of the frequency or the voltage of the power supply to vary the proportion of nitrogen dioxide in the exhaust gas.

The present disclosure provides, in another aspect, a method of treating exhaust gas from an internal combustion engine as the exhaust gas passes through an exhaust gas pathway. The method includes generating non-thermal plasma in a non-thermal plasma generator, increasing a proportion of nitrogen dioxide in the exhaust gas by introducing the non-thermal plasma into the exhaust gas, filtering particulate matter from the exhaust gas and converting nitrogen oxides ($NO_x$) from the exhaust gas with a first treatment element located downstream of the non-thermal plasma generator, and converting nitrogen oxides ($NO_x$) from the exhaust gas with a second treatment element located downstream of the first treatment element.

In some embodiments, the method includes injecting reductant into the exhaust gas between the non-thermal plasma generator and the first treatment element.

In some embodiments, the first treatment element includes a combined selective catalytic reduction and diesel particulate filter (SCR+F) element, and the second treatment element includes a selective catalytic reduction (SCR) element.

In some embodiments, generating non-thermal plasma includes directing at least a portion of the exhaust gas through a passage between a first electrode and a second electrode.

In some embodiments, generating non-thermal plasma includes generating a peak electrical potential difference between the first electrode and the second electrode of at least 1,000 volts at a frequency of at least 1,000 hertz.

In some embodiments, increasing the proportion of nitrogen dioxide in the exhaust gas includes converting nitric oxide into nitrogen dioxide in the presence of the non-thermal plasma.

Any of the above referenced aspects of the disclosure can be combined with any one or more of the above referenced aspects of the disclosure. Other features and aspects of the disclosure will become apparent by consideration of the following detailed description and accompanying drawings.

BRIEF DESCRIPTION OF THE DRAWINGS

FIG. 3 is an exploded view of a non-thermal plasma generator of the exhaust gas treatment system of FIG. 2.

FIG. 4 is a cross-sectional view of the non-thermal plasma generator of FIG. 3.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
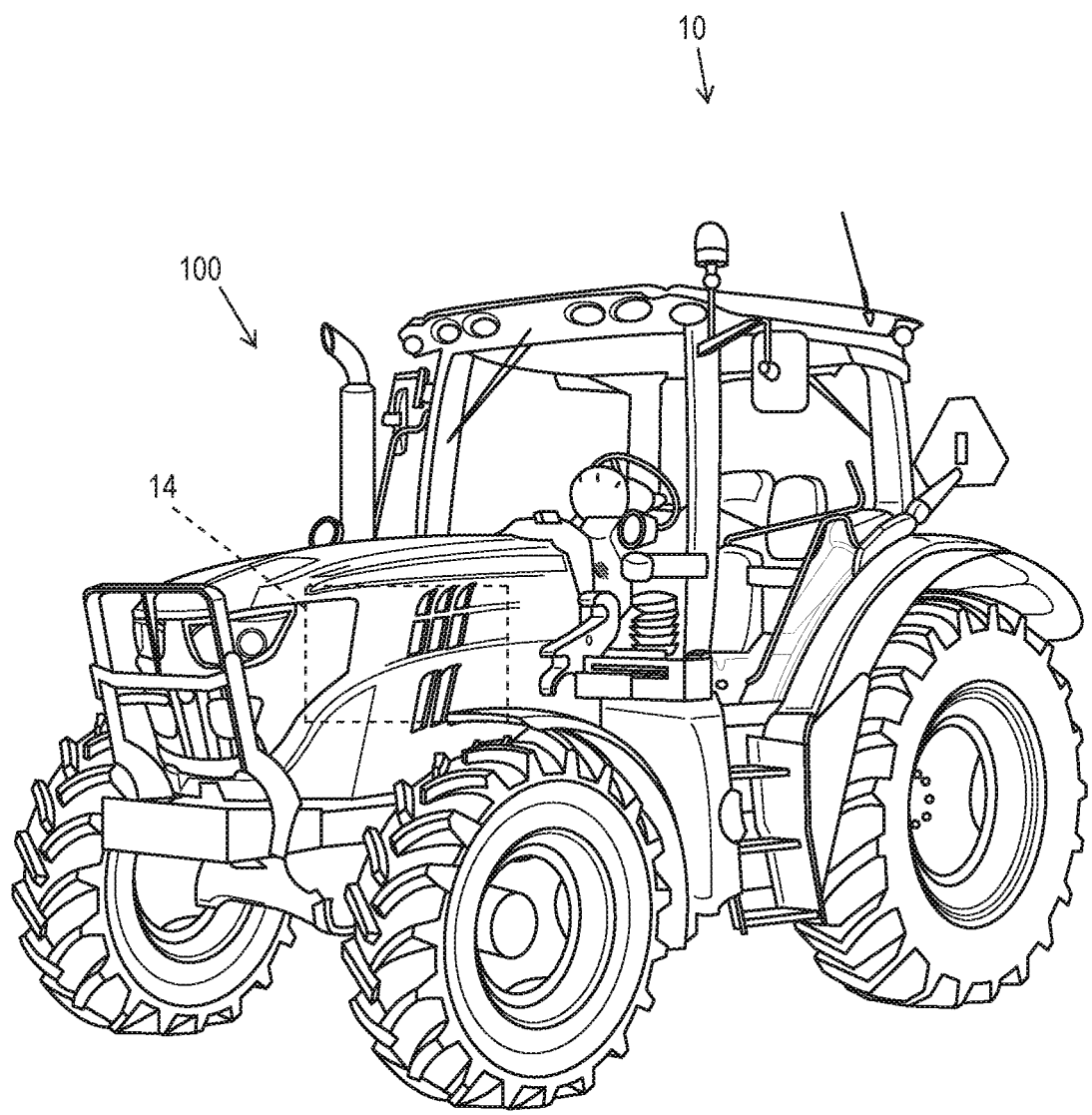
FIG. 1 is a perspective view of a vehicle in which the disclosed exhaust gas treatment system and method may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
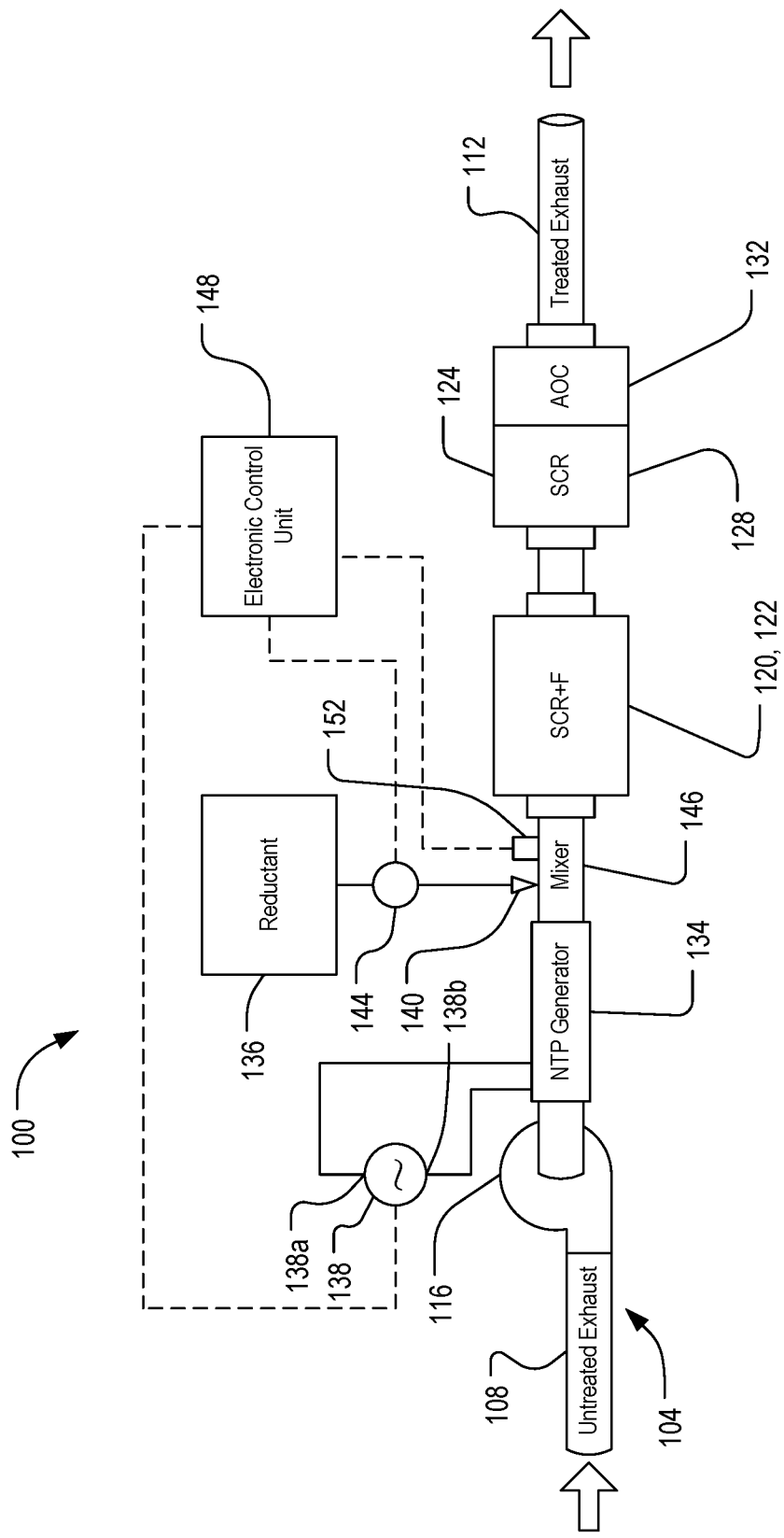
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A turbocharger 116 is disposed in the exhaust pathway 104 proximate the inlet 108, but in alternative embodiments, the turbocharger 116 may be omitted. In some embodiments, multiple turbochargers 116 may be provided in the exhaust pathway 104.

A first treatment element 120 and a second treatment element 124 are located in series along the exhaust pathway 104, between the inlet 108 and the outlet 112. Although the second treatment element 124 is located downstream of the first treatment element 120 in the illustrated embodiment, the numeric designations "first," "second," etc. are used herein for convenience and should not be regarded as defining order, quantity, or relative position. In addition, the illustrated first and second treatment elements 120, 124 are located downstream of the turbocharger 116. In other embodiments, however, the turbocharger 116 may be located between the first and second treatment elements 120, 124 or downstream of the treatment elements 120, 124.

In the embodiment illustrated in FIG. 2, the first treatment element 120 includes a combined selective catalytic reduction and diesel particulate filter (SCR+F) element 122 with a catalytic washcoat and a porous filter substrate. The washcoat includes one or more metal catalysts, such as a copper-based catalyst, an iron-based catalyst, or a vanadium-based catalyst. Alternatively, other washcoats (e.g., zeolite-based) may be used. As an SCR+F element, the first treatment element 120 captures particulate matter, oxidizes soot, and reduces $NO_x$ from exhaust gas passing through the first treatment element 120.

The second treatment element 124 in the illustrated embodiment includes a selective catalytic reduction (SCR) element 128 and an ammonia oxidation catalyst (AOC) 132. The SCR element 128 may include, for example, a catalytic washcoat on a monolithic support material, such as ceramic. The washcoat includes one or more metal catalysts, such as a copper-based catalyst, an iron-based catalyst, or a vanadium-based catalyst. Alternatively, other washcoats (e.g., zeolite-based) may be used.

The SCR element 128 and the AOC 132 are positioned in series, with the AOC 132 located downstream of the SCR element 128. The SCR element 128 reduces $NO_x$ from exhaust gas passing through it. The AOC 132 converts excess ammonia leaving the SCR element 128 to nitrogen and water. The SCR element 128 and the AOC 132 are packaged together within a common housing, as illustrated in FIG. 2. In some embodiments, the AOC 132 may be provided as a separate treatment element positioned downstream of the second treatment element 124.

In some embodiments, the positions of the SCR+F element 122 and the SCR element 128 may be reversed, such that the first treatment element 120 includes the SCR element 128 and the second treatment element 124 includes the SCR+F element 122.

With continued reference to FIG. 2, the exhaust gas treatment system 100 further includes a non-thermal plasma (NTP) generator 134. The NTP generator 134 is configured to produce NTP, which is introduced into the exhaust gas pathway 104. NTP oxidizes NO into $NO_2$, thereby increasing a proportion of $NO_2$ in the exhaust gas.

In the illustrated embodiment, the NTP generator 134 is positioned in the exhaust pathway 104 between the turbocharger 116 and the first treatment element 120 so as to increase the proportion of $NO_2$ in the exhaust gas before the exhaust gas enters the first treatment element 120. The NTP generator 134 is electrically coupled to a power supply 138, which in turn is powered via the electrical system of the vehicle 10.

With reference to FIGS. 3 and 4, the NTP generator 134 includes a first electrode 204, a second electrode 208, a first dielectric material 212 coupled to the first electrode 204, and a second dielectric material 216 coupled to the second electrode 208. The first dielectric material 212 and the second dielectric material 216 are spaced apart by a gap with a thickness 224, such that a passage 228 is defined between the electrodes 204, 208 along the length of the NTP generator 134. The thickness 224 of the gap is preferably constant along the length of the NTP generator 134.

In the illustrated embodiment, the first electrode 204 and the second electrode 208 are tube-shaped. That is, the first electrode 204 is configured as a first electrode tube, and the second electrode 208 is configured as a second electrode tube. The illustrated electrodes 204, 208 are concentric with the second electrode 208 surrounding the first tube 204. As such, the passage 228 is an annular passage extending along the length of the NTP generator 134. In other embodiments, the electrodes 204, 208 and the passage 228 may have other shapes and configurations. For example, in alternate embodiments, the electrodes 204, 208 may be configured as flat plates, with the passage 228 extending between the plates.

The first and second electrodes 204, 208 are made of a conductive material, such as copper. The first dielectric material 212 and the second dielectric material 216 are made of any suitable dielectric (i.e. non-conductive) material, such as quartz, glass, or alumina. The electrodes 204, 208 are electrically connected to the power supply 138 (FIG. 2). In particular, the first electrode 204 is electrically connected to a first terminal 138a of the power supply 138, and the second electrode 208 is electrically connected to a second, opposite terminal 138b of the power supply 138.

The power supply 138 is operable to generate a voltage between the first electrode 204 and the second electrode 208 of sufficient magnitude to cause a dielectric barrier discharge (DBD) across the gap between the dielectric materials 212, 216. The DBD generates non-thermal plasma within the passage 228. When exhaust gas flows through the passage 228, the non-thermal plasma oxidizes NO in the exhaust gas to $NO_2$.

In the illustrated embodiment, the power supply 138 is a high-frequency AC power supply capable of generating a peak voltage between the first electrode 204 and the second electrode 208 of at least 1,000 volts at a frequency of at least 1,000 hertz. In some embodiments, the voltage generated by the power supply 138 and/or the frequency of the power supply 138 may vary. Specifically, for a larger gap thickness 224, a larger voltage is required to cause a DBD across the gap. In some embodiments, the voltage and/or the frequency of the power supply 138 may be variably controlled to vary the amount of NTP (and therefore, $NO_2$) produced by the NTP generator 134. For example, a higher frequency setting can produce a greater amount of $NO_2$. Likewise, a higher voltage setting can produce a greater amount of $NO_2$.

In the illustrated embodiment, the NTP generator 134 further includes first and second end caps 232, 234 positioned at opposite, longitudinal ends of the NTP generator 134. The end caps 232, 234 couple the NTP generator 134 to the exhaust gas pathway 104. The first end cap 232 defines an upstream end of the NTP generator 134, and the second end cap 234 defines a downstream end of the NTP generator 134. The end caps 232, 234 are made of a non-conductive, heat resistant material and in some embodiments may be made of a polymeric material such as acetyl homopolymer (e.g., Delrin®) or polyetheretherketone (PEEK).

In the illustrated embodiment, the end caps 232, 234 structurally support the electrodes 204, 208 and dielectric material 212, 216. In some embodiments, one or more tension rods (not shown) may extend between the end caps 232, 234 to compress the electrodes and the dielectric material 212, 216 between the end caps 232, 234 and increase the rigidity of the NTP generator 134.

Figure 6:
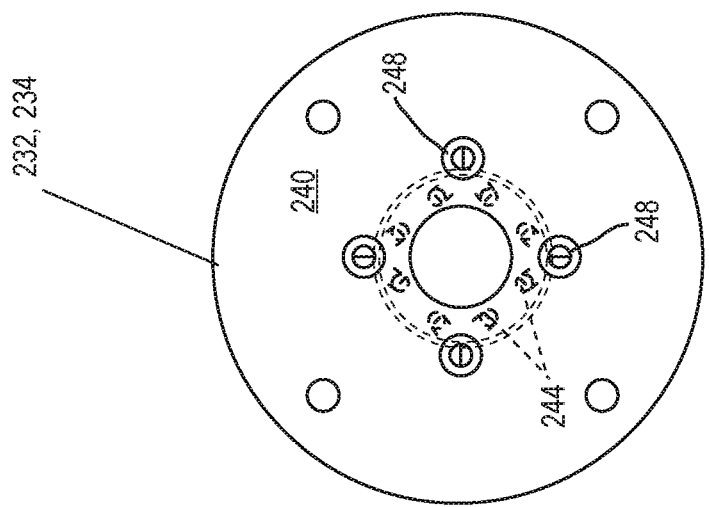
FIG. 6 is a second side view of the end cap of FIG. 5.
Figure 5:
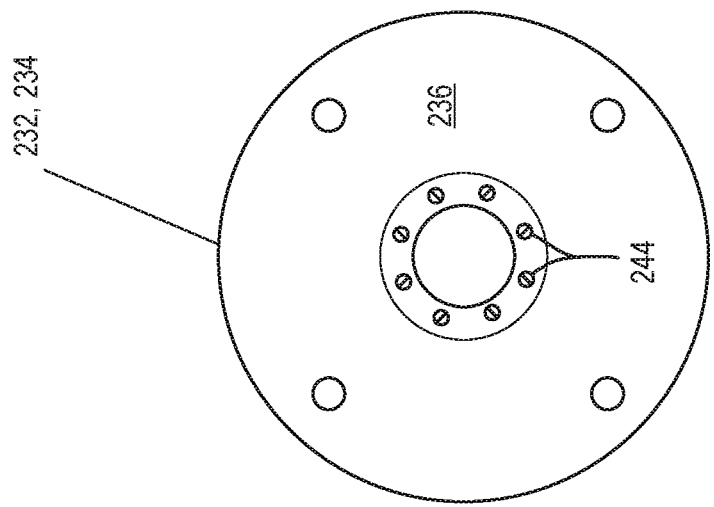
FIG. 5 is a first side view of an end cap of the non-thermal plasma generator of FIG. 3.
Figure 7:
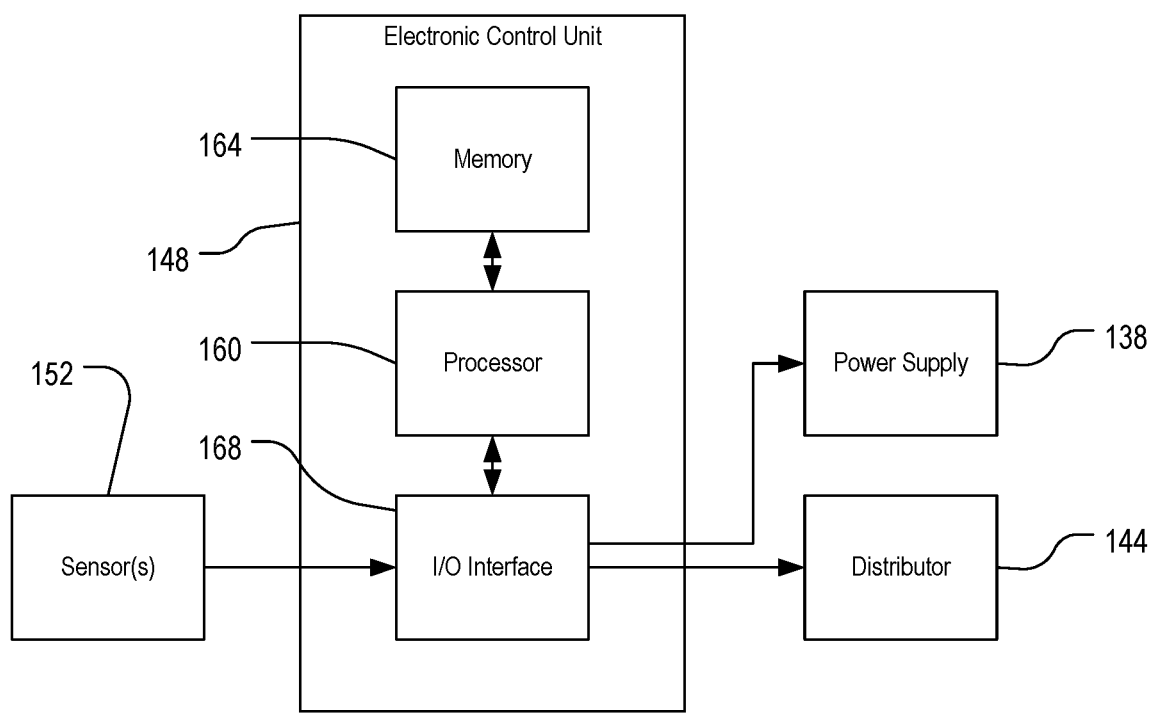
FIG. 7 is a schematic diagram of an electronic control unit of the exhaust gas treatment system of FIG. 2.

With reference to FIGS. 5 and 6, each of the end caps 232, 234 has a first side 236 (FIG. 5) facing the electrodes 204, 208 and a second side 240 (FIG. 6) opposite the first side 236. The first side 236 includes a first plurality of ports 244 (FIG. 5, and shown in phantom in FIG. 6), and the second side 240 includes a second plurality of ports 248 (FIG. 6).

The second ports 248 of the first end cap 232 receive incoming exhaust gas from the exhaust gas pathway 104, and the second ports 248 of the second end cap 234 discharge exhaust gas out of the NTP generator 134.

The first ports 244 of each end cap 232, 234 are arranged in an annular pattern and aligned with the ends of the passage 228. The first ports 244 of each end cap 232, 234 are fluidly coupled to the second ports 248. As such, exhaust gas received through the second ports 248 of the first end cap 232 is directed into the passage 228 via the first ports 248, and the exhaust gas exits the passage 228 through the first ports 244 of the second end cap 234 before being discharged from the NTP generator 134 via the second ports 248.

In the illustrated embodiment, the first plurality of ports 244 includes a greater number of ports than the second plurality of ports 248. As such, the end caps 232, 234 may act as manifolds to more evenly distribute exhaust gas in the passage 228. In some embodiments, the first plurality of ports 244 includes twice as many ports as the second plurality of ports 248. The first plurality of ports 244 and the second plurality of ports 248, however, may include any number of ports in other embodiments. In addition, it should be understood that the construction of the end caps 232, 234 may vary depending on the shape and configuration of the electrodes 204, 208.

Referring to FIG. 2, the exhaust gas treatment system 100 further includes a reductant supply 136 and a reductant injector 140 in fluid communication with the reductant supply 136 via a distributor 144. The reductant supply 136 includes a reservoir for storing a reductant, such as diesel exhaust fluid (DEF) or ammonia. The distributor 144 can include one or more pumps, valves, and the like to selectively control the flow of reductant from the reductant supply 136 to the injector 140. The reductant injector 140 is positioned to introduce reductant into the exhaust gas pathway 104, downstream of the NTP generator 134 and upstream of the first treatment element 120 (i.e., between the NTP generator 134 and first treatment element 120). In the illustrated embodiment, a mixer 146 is provided in the exhaust gas pathway 104 downstream of the reductant injector 140. The mixer 146 includes one or more flow affecting features (e.g., fins, vanes etc.) to create swirling or turbulence within the exhaust gas, thereby mixing the injected reductant into the exhaust gas.

An electronic control unit (ECU 148) actively controls various aspects of the operation of the exhaust gas treatment system 100. A sensor 152 is communicatively coupled to the ECU 148 to provide feedback to the ECU 148 indicative of an operating parameter of the exhaust gas treatment system 100. For example, in the illustrated embodiment, the sensor 152 is a $NO_x$ concentration sensor. Other sensor(s) may be provided to sense other operating parameters of the system 100, including but not limited to temperature, exhaust flow rate, pressure, ammonia concentrations, and the like at one or more points along the exhaust pathway 104 and provide feedback to the ECU 148 indicative of the performance of the exhaust gas treatment system 100.

FIG. 3 illustrates an example of the ECU 148 for control of the exhaust gas treatment system 100. The ECU 148 includes a plurality of electrical and electronic components that provide power, operational control, and protection to the components and modules within the ECU 148. In particular, the ECU 148 includes, among other things, an electronic processor 160 (e.g., a programmable microprocessor, microcontroller, or similar device), non-transitory, machine-readable memory 164, and an input/output interface 168. The electronic processor 160 is communicatively coupled to the memory 164 and configured to retrieve from memory 164 and execute, among other things, instructions related to the control processes and methods described herein. In other embodiments, the ECU 148 includes additional, fewer, or different components. In the illustrated embodiment, the ECU 148 is communicatively coupled to the sensor 152, the power supply 138, and the distributor 144. The ECU 148 may also be configured to communicate with external systems including, for example, engine controls and/or vehicle controls.

In operation, untreated exhaust from the internal combustion engine 14 (FIG. 1) is directed into the exhaust pathway 104 at the inlet 108 (FIG. 2). The exhaust then flows through the turbocharger 116, which turns a compressor to feed compressed air back to the engine 14. After flowing through the turbocharger 116, the exhaust gas flows into the NTP generator 134.

The ECU 148 controls the power supply 138 to generate NTP as the exhaust gas flows through the passage 228 in the NTP generator 134. The generated NTP oxidizes NO within the exhaust gas to $NO_2$, thereby increasing a proportion of $NO_2$ within the exhaust gas. In some embodiments, the generated NTP may also oxidize oxygen ($O_2$) in the exhaust gas to ozone ($O_3$).

The exhaust gas exits the NTP generator 134 and flows toward the first treatment element 120, which includes the SCR+F element 122 in the embodiment of FIG. 2. The ECU 148 commands the distributor 144 to supply reductant to the injector 140. The mixer 146 mixes the reductant evenly within the exhaust gas and also ensures even distribution of $NO_2$ within the exhaust gas downstream of the NTP generator 134.

The mixture of reductant and exhaust gas then enters the first treatment element 120. The reductant reacts with $NO_x$ in the presence of the catalyst of the SCR+F element 122 to form nitrogen and water, while soot is captured on the porous filter substrate. The $NO_2$ enhances catalytic $NO_x$ reduction in the SCR+F element 122 in accordance with Equation (1). In addition, the $NO_2$ enhances passive regeneration of the filter substrate in the SCR+F element 122 by oxidizing soot in accordance with Equations (3) and (4). Ozone has also been shown to oxidize soot. Accordingly, any ozone produced by the NTP generator 134 further enhances regeneration of the filter substrate in the SCR+F element 122.

The ECU 148 may receive feedback from the $NO_x$ concentration sensor 152 and vary the voltage and/or frequency of the power supply 138 in order to maintain a target concentration of $NO_2$ upstream of the first treatment element 120. For example, the ECU 148 may control the power supply 138 to maintain an equal molar ratio of NO and $NO_2$ in the exhaust gas. Such control advantageously allows the competing $NO_2$ demands for $NO_x$ reduction and soot oxidation within the SCR+F element 122 to be optimized, improving overall emission reduction performance of the exhaust gas treatment system 100. In addition, because the NTP generator 134 can produce $NO_2$ even at low temperatures, $NO_2$ is made available for $NO_x$ reduction even during cold start conditions.

After exiting the first treatment element 120, the partially treated exhaust then enters the second treatment element 124, where the reductant reacts with any remaining $NO_x$ in the SCR portion 128, and any unreacted reductant is subsequently oxidized in the AOC portion 132. The treated exhaust then exits the exhaust gas treatment system 100 through the outlet 112.

The NTP generator 134 thus promotes soot oxidation on the SCR+F element 122 and enhances $NO_x$ reduction on demand, without requiring a diesel oxidation catalyst or other precious metal catalyst upstream of the first treatment element 120. Since there is no precious metal catalyst upstream of the first treatment element 120, precious metal accumulation on the filter substrate of the SCR+F element 122 is eliminated. In some embodiments, $NO_2$ and ozone produced by the NTP generator 134 may maintain sufficiently low soot levels on the SCR+F element 122 to eliminate the need for periodic active regeneration.

Figure 8:
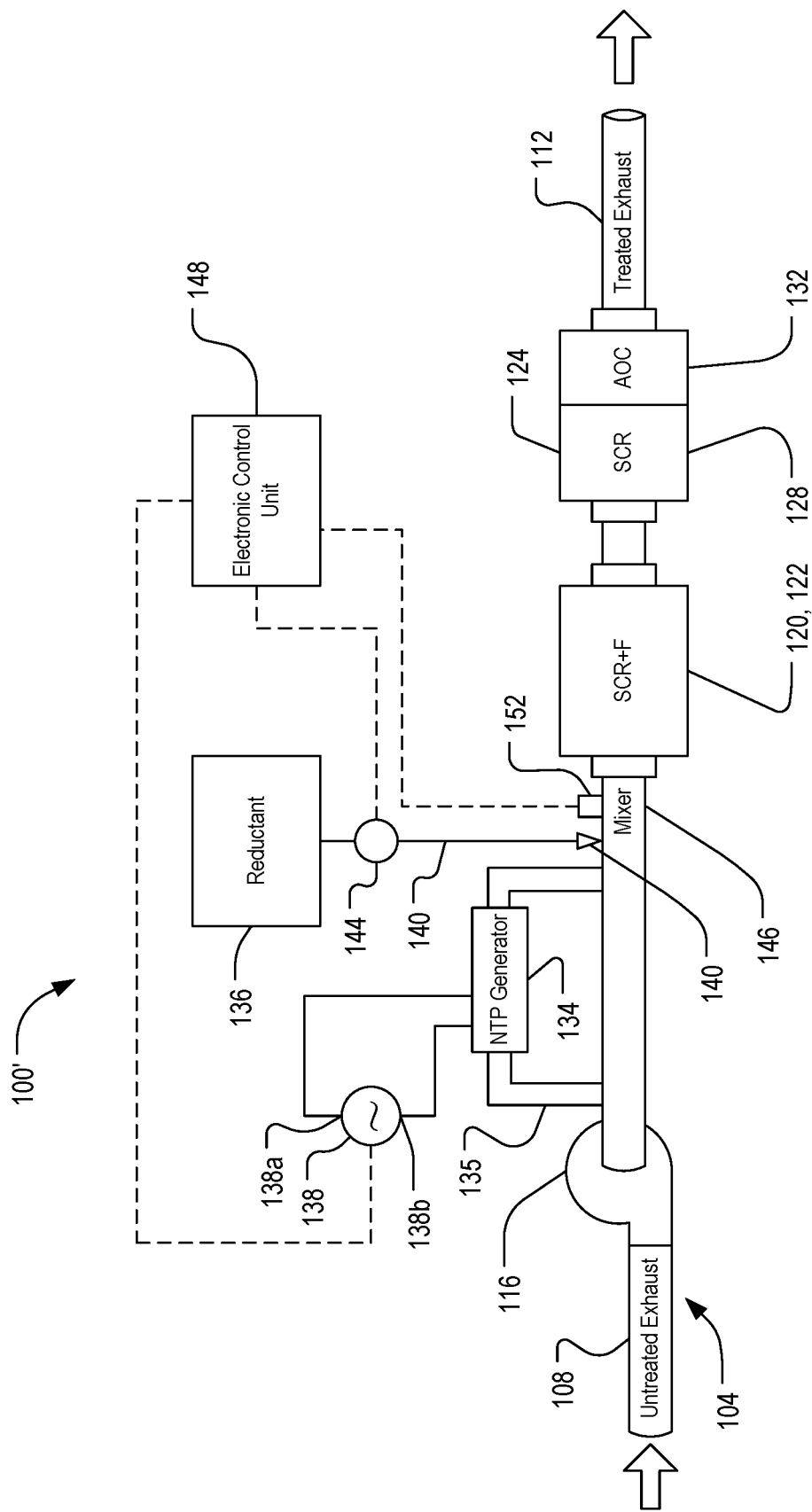
FIG. 8 is a schematic diagram of an exhaust gas treatment system according to another embodiment.

FIG. 8 illustrates an exhaust gas treatment system 100' according to another embodiment. The exhaust gas treatment system 100' is similar to the exhaust gas treatment system 100 described above with reference to FIG. 2, and features and elements of the exhaust gas treatment system 100' corresponding with features and elements of the exhaust gas treatment system 100 are given identical reference numbers. In addition, the following description focuses on the differences between the exhaust gas treatment system 100' and the exhaust gas treatment system 100.

Rather than receiving all of the exhaust gas passing through the exhaust gas pathway 104, the NTP generator 134 in the illustrated embodiment is coupled to the exhaust gas pathway 104 in parallel. That is, only a portion of the exhaust gas enters an auxiliary pathway 135 to flow through the NTP generator 134, while the remaining portion of the exhaust gas bypasses the NTP generator 134.

Because only a portion of the exhaust gas flows through the NTP generator 134, the pressure drop in the exhaust gas treatment system 100' due to the flow restriction of the NTP generator 134 is advantageously reduced. The mixer 146 mixes the portion of the exhaust gas that passed through the NTP generator 134 with the remaining portion of the exhaust gas prior to the exhaust gas entering the first treatment element 120.

In some embodiments, a valve (not shown) may be provided to selectively divert a portion of the exhaust gas into the auxiliary pathway 135 to the NTP generator 134. That is, exhaust gas may be selectively directed to the NTP generator 134 via the auxiliary pathway 135 only when the ECU 148 determines that additional $NO_2$ is needed. If no additional $NO_2$ is needed, the valve may be closed such that substantially all of the exhaust gas bypasses the NTP generator 134.

Various features of the disclosure are set forth in the following claims.

What is claimed is:

1. An exhaust gas treatment system for an internal combustion engine, the system comprising:
    an exhaust gas pathway configured to receive exhaust gas from the internal combustion engine;
    a non-thermal plasma generator positioned in the exhaust gas pathway, the non-thermal plasma generator configured to increase a proportion of nitrogen dioxide in the exhaust gas;
    a first treatment element positioned in the exhaust gas pathway downstream of the non-thermal plasma generator;
    a second treatment element positioned in the exhaust gas pathway downstream of the first treatment element;
    a NOx concentration sensor configured to measure a concentration of NOx in the exhaust gas pathway downstream of the non-thermal plasma generator; and
    a controller configured to control the non-thermal plasma generator to vary the proportion of nitrogen dioxide in the exhaust gas based on feedback from the NOx concentration sensor,
    wherein the first treatment element includes a combined selective catalytic reduction and diesel particulate filter (SCR+F) element or a selective catalytic reduction (SCR) element, and
    wherein the exhaust gas treatment system does not include a precious metal catalyst upstream of the first treatment element, and
    wherein the non-thermal plasma generator includes a first electrode, a second electrode, and an end cap having a first side facing the first and second electrodes and a second side opposite the first side, wherein the first side includes a first plurality of ports and the second side includes a second plurality of ports in fluid communication with the first plurality of ports, and wherein the first plurality of ports includes a greater number of ports than the second plurality of ports.

2. The exhaust gas treatment system of claim 1, wherein the first treatment element includes the SCR+F element, and wherein the second treatment element includes the SCR element.

3. The exhaust gas treatment system of claim 1, further comprising an ammonia oxidation catalyst (AOC) positioned in the exhaust gas pathway downstream of the second treatment element.

4. The exhaust gas treatment system of claim 1, wherein the controller is configured to control the non-thermal plasma generator to maintain an equal molar ratio of nitric oxide and nitrogen dioxide at a position in the exhaust gas pathway based on feedback from the NOx concentration sensor.

5. The exhaust gas treatment system of claim 1, further comprising an injector configured to inject reductant into the exhaust gas pathway.

6. The exhaust gas treatment system of claim 5, wherein the injector is configured to inject the reductant into the exhaust gas pathway between the non-thermal plasma generator and the first treatment element.

7. The exhaust gas treatment system of claim 1, wherein the non-thermal plasma generator includes a passage defined between the first electrode and the second electrode, and wherein the non-thermal plasma generator is configured such that at least a portion of the exhaust gas flows through the passage during operation of the non-thermal plasma generator.

8. The exhaust gas treatment system of claim 7, wherein the exhaust gas pathway is configured such that a portion of the exhaust gas bypasses the non-thermal plasma generator.

9. The exhaust gas treatment system of claim 7, further comprising an alternating current power supply operable at a frequency of at least 1,000 hertz, the power supply configured to generate a peak voltage between the first electrode and the second electrode with a magnitude of at least 1,000 volts.

10. The exhaust gas treatment system of claim 9, wherein the controller is configured to vary at least one of the frequency or the voltage of the power supply to vary the proportion of nitrogen dioxide in the exhaust gas.

11. An exhaust gas treatment system for an internal combustion engine, the system comprising:
    an exhaust gas pathway configured to receive exhaust gas from the internal combustion engine;

a non-thermal plasma generator positioned in the exhaust gas pathway such that at least a portion of the exhaust gas flows through the non-thermal plasma generator;

a combined selective catalytic reduction and diesel particulate filter (SCR+F) element positioned downstream of the non-thermal plasma generator;

a NOx concentration sensor configured to measure a concentration of NOx in the exhaust gas pathway downstream of the non-thermal plasma generator; and a controller configured to control the non-thermal plasma generator to vary a proportion of nitrogen dioxide in the exhaust gas based on feedback from the NOx concentration sensor, wherein the exhaust gas treatment system does not include a precious metal catalyst upstream of the SCR+F element, and wherein the non-thermal plasma generator includes a first electrode, a second electrode, and an end cap having a first side facing the first and second electrodes and a second side opposite the first side, wherein the first side includes a first plurality of ports and the second side includes a second plurality of ports in fluid communication with the first plurality of ports, and wherein the first plurality of ports includes a greater number of ports than the second plurality of ports.

12. The exhaust gas treatment system of claim 11, wherein the controller is configured to control the non-thermal plasma generator to maintain an equal molar ratio of nitric oxide and nitrogen dioxide at a position in the exhaust gas pathway based on feedback from the NOx concentration sensor.

13. The exhaust gas treatment system of claim 11, wherein the non-thermal plasma generator includes a passage defined between the first electrode and the second electrode, and wherein the non-thermal plasma generator is configured such that only a portion of the exhaust gas flows through the passage during operation of the non-thermal plasma generator.

14. The exhaust gas treatment system of claim 13, further comprising:

an alternating current power supply operable at a frequency of at least 1,000 hertz, the power supply configured to generate a peak voltage between the first electrode and the second electrode with a magnitude of at least 1,000 volts, wherein the controller is configured to vary at least one of the frequency or the voltage of the power supply to vary the proportion of nitrogen dioxide in the exhaust gas.

15. A method of treating exhaust gas from an internal combustion engine as the exhaust gas passes through an exhaust gas pathway, the method comprising:

generating non-thermal plasma in a non-thermal plasma generator, the non-thermal plasma generator including a first electrode, a second electrode, a passage defined between the first electrode and the second electrode, and an end cap having a first side facing the first and second electrodes and a second side opposite the first side, wherein the first side includes a first plurality of ports and the second side includes a second plurality of ports in fluid communication with the first plurality of ports, and wherein the first plurality of ports includes a greater number of ports than the second plurality of ports;

introducing the non-thermal plasma into the exhaust gas by routing at least a portion of the exhaust gas through the first plurality of ports and the second plurality of ports such that the portion of the exhaust gas flows through the passage;

controlling the non-thermal plasma generator to maintain an equal molar ratio of nitric oxide and nitrogen dioxide at a position in the exhaust gas pathway based on feedback from a sensor;

filtering particulate matter from the exhaust gas and converting nitrogen oxides (NOx) from the exhaust gas with a first treatment element located downstream of the non-thermal plasma generator; and converting nitrogen oxides (NOx) from the exhaust gas with a second treatment element located downstream of the first treatment element.

16. The method of claim 15, further comprising injecting reductant into the exhaust gas between the non-thermal plasma generator and the first treatment element.

17. The method of claim 15, wherein the first treatment element includes a combined selective catalytic reduction and diesel particulate filter (SCR+F) element, and wherein the second treatment element includes a selective catalytic reduction (SCR) element.

18. The method of claim 15, wherein generating non-thermal plasma further includes generating a peak electrical potential difference between the first electrode and the second electrode of at least 1,000 volts at a frequency of at least 1,000 hertz.

* * * * *